United States Patent
Takeishi et al.

(10) Patent No.: US 6,711,000 B2
(45) Date of Patent: Mar. 23, 2004

(54) ALUMINUM ELECTROLYTIC CAPACITOR AND PROCESS OF PRODUCING THE SAME

(75) Inventors: Nobuhiro Takeishi, Kyoto (JP); Hiroyuki Kusaka, Kyoto (JP); Kazutoshi Yanai, Kyoto (JP); Kazuhiro Minami, Kyoto (JP); Toshiyuki Hata, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/309,070

(22) Filed: Dec. 4, 2002

(65) Prior Publication Data
US 2003/0117762 A1 Jun. 26, 2003

(30) Foreign Application Priority Data
Dec. 6, 2001 (JP) .................................... P2001-372272

(51) Int. Cl.$^7$ ................................................ H01G 9/00
(52) U.S. Cl. ........................ 361/523; 361/502; 361/503; 361/508; 361/528; 29/25.03
(58) Field of Search ................................. 361/523, 528, 361/503, 502, 508, 516, 518, 519, 301.1, 301.3, 514, 433; 29/25.03

(56) References Cited

U.S. PATENT DOCUMENTS 6,064,563 A * 5/2000 Yamada et al.
6,310,756 B1 * 10/2001 Miura et al.

FOREIGN PATENT DOCUMENTS

JP 2577818 5/1998

* cited by examiner

*Primary Examiner*—Anthony Dinkins
*Assistant Examiner*—Nguyen T. Ha
(74) *Attorney, Agent, or Firm*—Wenderoth, Lind & Ponack, L.L.P.

(57) ABSTRACT

There is provided an aluminum electrolytic capacitor including a hollow capacitor element composed of an anode foil, a cathode foil each with an extracted lead member connected thereto, and a separator between both the foil wound into a coil, an end face of the cathode foil is projected relative to the corresponding face of the anode foil; a elastic sheet which is wound on the periphery of the capacitor element; a cylindrical metallic case having the bottom in which a fixing rod is projected on the center of the bottom for fitting into a hollow hole part of the capacitor element and one or more fixing ribs are provided on the bottom for abutting with the projected end face of the cathode foil; and a sealing plate for covering the upper opening of the metal case which has a pair of terminals formed passing through the sealing plate for connecting to extracted lead member of the capacitor element and a threaded portion for external connection; wherein the metal case has one or more annular extrusions projected inside around the case; the capacitor element is housed in the case with an electrolyte with the upper opening of the case being sealed with the sealing plate via an O-ring around the periphery of the sealing plate; and the capacitor element is partly fixed via the elastic sheet by the one or more annular protrusions inside the metal case.

5 Claims, 7 Drawing Sheets

ALUMINUM ELECTROLYTIC CAPACITOR AND PROCESS OF PRODUCING THE SAME

BACKGROUND OF THE INVENTION

1. Field of the Invention

The present invention relates to an aluminum electrolytic capacitor for use in various electronic applications and a process of producing the same.

2. Prior Art

Referring to FIGS. 6, 7A and 7B, there are shown an example of conventional aluminum electrolytic capacitors, including; a capacitor element 51 which includes a winding of an anode foil and a cathode foil with each extracted lead section 52 connected therewith; a cylindrical metallic case 53 having the bottom which houses the capacitor element 51 together with driving electrolyte (not shown) contained therein; a sealing plate 54 mounted so as to seal the upper opening of the metallic case 53 through an O-ring 57; and a pair of terminals 55 formed through the sealing plate 54 with a threaded portion 56 provided therein which are connected to the anode and cathode.

Moreover, the capacitor element 51 is fixed by a fixing material 58 such as atactic polypropylene resin which is not easily to vibrate by external impact. The conventional aluminum electrolytic capacitors with such a structure have had high vibration resistant.

However, in the above conventional aluminum electrolytic capacitors, there has been a problem that since the fixing material 58 is made of thermoplastic such as atactic polypropylene resin, the fixing material 58 softens when the temperature of the aluminum electrolytic capacitor rises, and then if vibration is applied to the capacitor the function of fixing the capacitor element 51 lowers, therefore the extracted lead portion 52 of the capacitor element 51 is disconnected to become impossible to act as the aluminum electrolytic capacitor.

Also, there has been a danger that since thermoplastic making the fixing material 58 is a combustible, for example, when unusually high load is applied to the aluminum electrolytic capacitor to operate a safety valve (not shown) provided on the sealing plate 54, the fixing material 58 made of thermoplastic has a risk of outflow from the case and burning.

Moreover, there has been a problem that since in the case where the capacitor element 51 is inserted into the metallic case 53 to fix, the fixing material 58 is first melted to inject into the metallic case 53 and next, the capacitor element 51 is inserted into the metallic case 53 to fix and then it should be left as it is until the fixing material 58 softens by natural cooling, therefore productivity decrease.

As a method for solving the problem of the aluminum electrolytic capacitor using the fixing material 58, Japanese Utility Model No. 2577818 discloses a vibration resistance structure having: a capacitor element formed by winding two opposite electrode foils through a separator around a metal core as an axis; and a fixing member including projection portions fixed on a spring dishes disposed on the inside bottom and top of a cylindrical sheath case housing the capacitor element, whereby the top and bottom projection portions fit into the top and bottom ends of the metal core hole of the capacitor element, securely fixing the capacitor element with less vibration with respect to the case.

The aluminum electrolytic capacitors mentioned above have a feature of sufficient resistance to shocks occurring in usual applications with a vibration frequencies from several tens to several hundreds Hz and to shocks given to the capacitor when fallen. However, for the capacitors used in automotive parts, quick vibrations of more than 1 kHz are almost continuously applied to the capacitors while the vehicles are driven so that extracted lead portions 52 may be apt to be broken because the capacitor element is fixed, insufficiently, only by fitting the projected portions into the top and bottom holes of the core of the capacitor element.

SUMMARY OF THE INVENTION

An object of the present invention, to solve such prior art problems, is to provide an aluminum electrolytic capacitor having high resistance to vibration in high frequency.

Another object of the present invention is to provide an aluminum electrolytic capacitor having high resistance to high temperatures and having increased productivity in manufacturing.

In order to fulfill the above objects, in the invention an aluminum electrolytic capacitor is provided including: a hollow capacitor element composed of an anode foil and a cathode foil connecting to extracted lead members and a separator therebetween together which are wound into a coil, one of end faces of the cathode foil being projected relative to that of the anode foil; an elastic sheet which is wound on the periphery of the capacitor element, a cylindrical metallic case having the bottom having a fixing rod on the center thereof for fitting into a hollow hole part of the capacitor element and having one or more fixing ribs radially projected on the bottom face of the case for abutting with the projected end face of the cathode foil; and a sealing plate having a pair of terminals formed therethrough which are connected with the extracted lead members of the capacitor element, wherein the capacitor element is housed into the case with a driving electrolyte, an open end of the case being sealed with the sealing plate while the capacitor element wound with the elastic sheet is partly fixed by means of an annular protrusion provided inside the case.

The one or more fixing ribs and the projected end of the cathode foil have action of dissipating heat created in the capacitor element through the metallic case to the exterior.

Also, the fixing rib provided on the bottom thereof and the annular protrusions around the case have an action of fixing the capacitor element inside the metal case so securely that the capacitor may withstands high frequency vibrations induced from vehicles driven in movement.

Moreover, in manufacturing such a aluminum electrolytic capacitor, the manufacturing process may be simplified with increased productivity by using an impact formation process wherein the fixing rod for fitting into the hollow hole part of the capacitor element and the fixing ribs for abutting with the projected end face of the cathode foil may make the case encase the capacitor element securely and integrally.

The present invention includes a process of producing an aluminum electrolytic capacitor which including the steps of: forming a hollow capacitor element by interposing a separator between an anode foil and a cathode foil with which an extracted lead member is connected respectively and winding the anode foil and the cathode foil so that one end face of the cathode foil is projected;

winding an elastic sheet on the periphery of the capacitor element; inserting the capacitor element and driving electrolyte into a metallic case having the bottom in which a fixing rod is provided for fitting into a hollow hole part of the capacitor element and one or more fixing ribs formed thereon for abutting with the projected end face of the cathode foil; connecting the extracted lead members of the capacitor element with each connecting portion provided on the sealing plate; sealing an open end of the case with the sealing plate with an O-ring provided around the sealing plate; and contracting the periphery of the case to form an annular protrusion fastening the elastic sheet at a portion of the capacitor element which protrusion makes the metallic case fix the capacitor element securely and integrally.

The process of the invention has an advantage of easy and stable producing of an aluminum electrolytic capacitor having the ability to dissipate heat created therein and high vibration resistance performance for the capacitor element.

BRIEF DESCRIPTION OF THE DRAWINGS

The present invention is explained in detail below with reference to the accompanying drawings, in which.

DESCRIPTION OF THE PREFERRED EMBODIMENTS

Embodiment 1

An embodiment of aluminum electrolytic capacitor according to the present invention will be described below.

Figure 1:
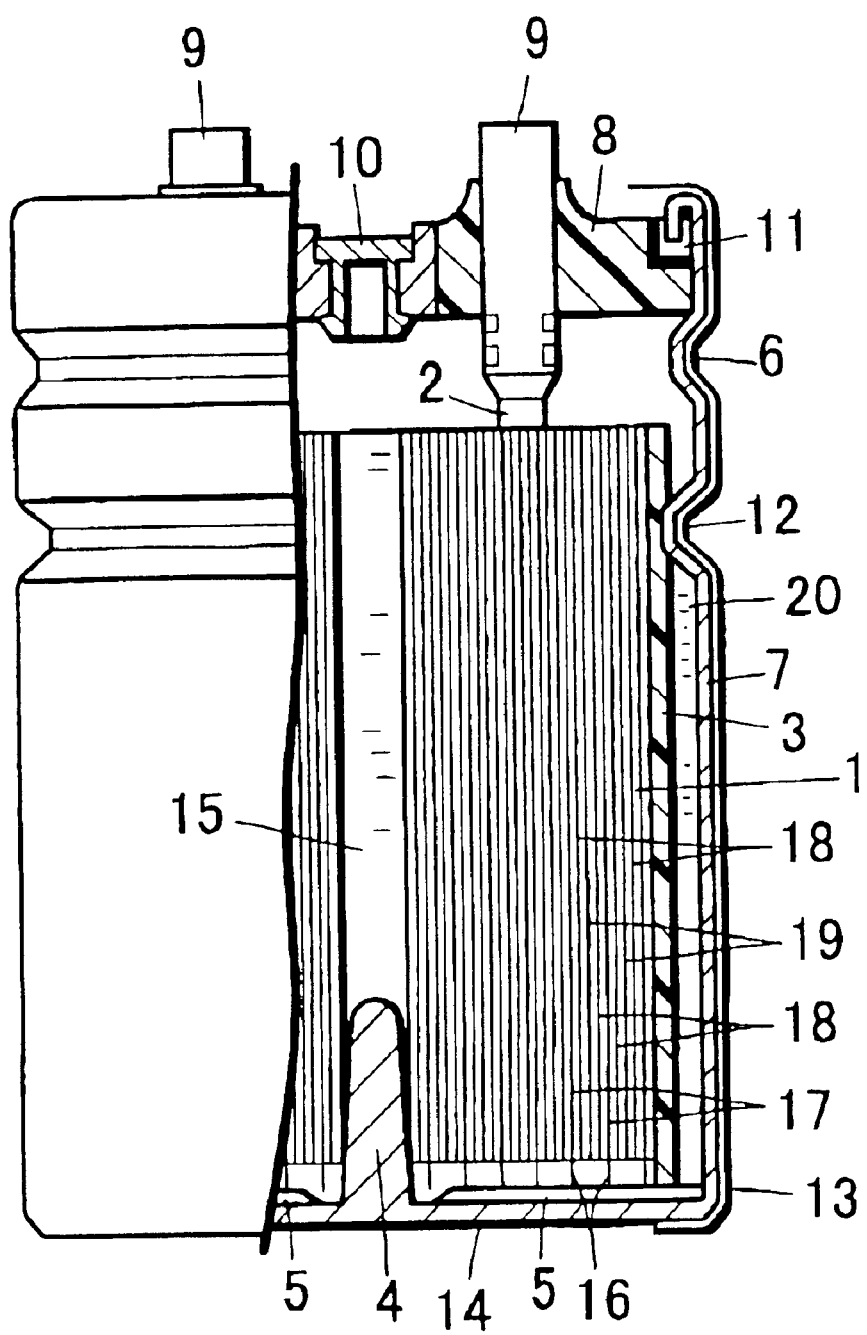
FIG. 1 is a partially cross-sectional view showing constitution of an aluminum electrolytic capacitor according to an embodiment of the present invention.

FIG. 1 shows a capacitor element 1 including a winding body of an anode foil 19, a cathode foil 17, both made of aluminum, and a separate sheet 18, made of a porous, insulating paper, all which are wound in a coil, or a role, around a hollow core, the lower end 16 of the cathode foil 17 being projected longer relative to the lower end face of the anode foil 19.

Figure 2:
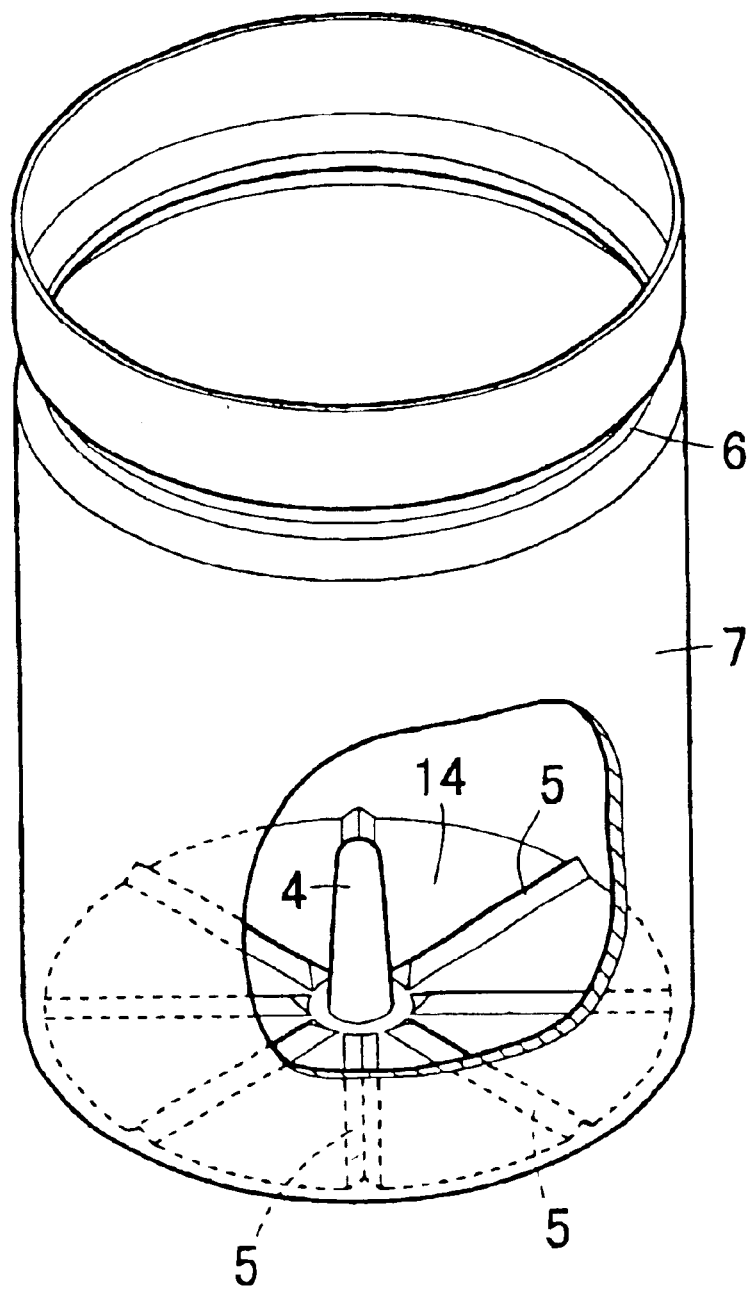
FIG. 2 is a perspective view showing a metallic case of the aluminum electrolytic capacitor according to the embodiment of the present invention.

An elastic sheet 3 is wound around the periphery of the capacitor element 1 and is encased in a cylindrical metallic case 7 on the bottom 14, made of metal, of the case, together with driving electrolyte 20. A fixing center rod 4, which is shown in FIG. 2, is projected from the center of the bottom of the metal case 7 to be inserted and fitted into a hollow core of the capacitor element 1, and as shown in FIG. 2, a plurality of fixing ribs 5 of metal are projected radially from a center of the bottom 14 of metal, abutting with the projected lower end 16 of the cathode foil 17 of the capacitor element 1 on the bottom 14 thereof as shown in FIG. 1.

There is provided a contraction work portion 6 at the position of the upper opening of the metallic case 7. Also, the fixing rod 4 and the fixing ribs 5, which are of a metal, are formed integrally to the bottom of the metal case 7, which can be deformed by impact forming of a metal plate.

A sealing plate 8 includes a pair of terminals 9 and 9 wherein there are provided a connection portion for connecting with the extracted lead member 2 of the capacitor element 1 and a threaded portion for external connection and a safety valve 10. The sealing plate 8 is fixed at the contraction work portion 6 by curling the open end of the metallic case 7 having the bottom through the O-ring 11 at the periphery. An annular protrusion 12 is provided inside the metallic case 7 and this annular protrusion 12 can fix the capacitor element 1 by contraction work of the periphery of the metallic case 7 into which the capacitor element 1 has been inserted. A resin sheath 13 covers the outer side of the metal case 7.

Aluminum electrolytic capacitors were fabricated by the design of the above embodiment 1 and tested with vibrations on the various testing conditions, the test result shown in Table 1, below.

TABLE 1

| vibration testing conditions | testing A 10 to 500 Hz 10 Gal max. | | | | testing B 30 to 2000 Hz 20 Gal max | | | |
|---|---|---|---|---|---|---|---|---|
| | C (μF) | Tanδ (%) | LC (μA) | Discon- nection | C (μF) | tanδ (%) | LC (μA) | Discon- nection |
| embodiment 1 | 1014.2 | 2.27 | 82.7 | No | 1057.5 | 2.08 | 63.5 | No |
| | 1009.7 | 2.28 | 59.2 | No | 1013.6 | 2.08 | 70.7 | No |
| | 1010.2 | 1.86 | 70.0 | No | 1059.1 | 2.15 | 78.7 | No |
| | 1016.0 | 2.30 | 63.9 | No | 1051.0 | 2.22 | 73.8 | No |
| | 1022.1 | 2.26 | 48.0 | No | 1016.2 | 2.20 | 55.5 | No |
| comparative example | 1013.2 | 2.26 | 80.2 | No | — | — | — | Discon. |
| | 1058.7 | 2.08 | 87.7 | No | — | — | — | Discon. |
| | 1048.2 | 2.06 | 52.8 | No | — | — | — | Discon |
| | 1014.6 | 2.02 | 42.3 | No | — | — | — | Discon. |
| | 1051.8 | 2.58 | 83.6 | No | — | — | — | discon. |

*10 Gal and 20 Gal are gravitational acceleration

Figure 6:
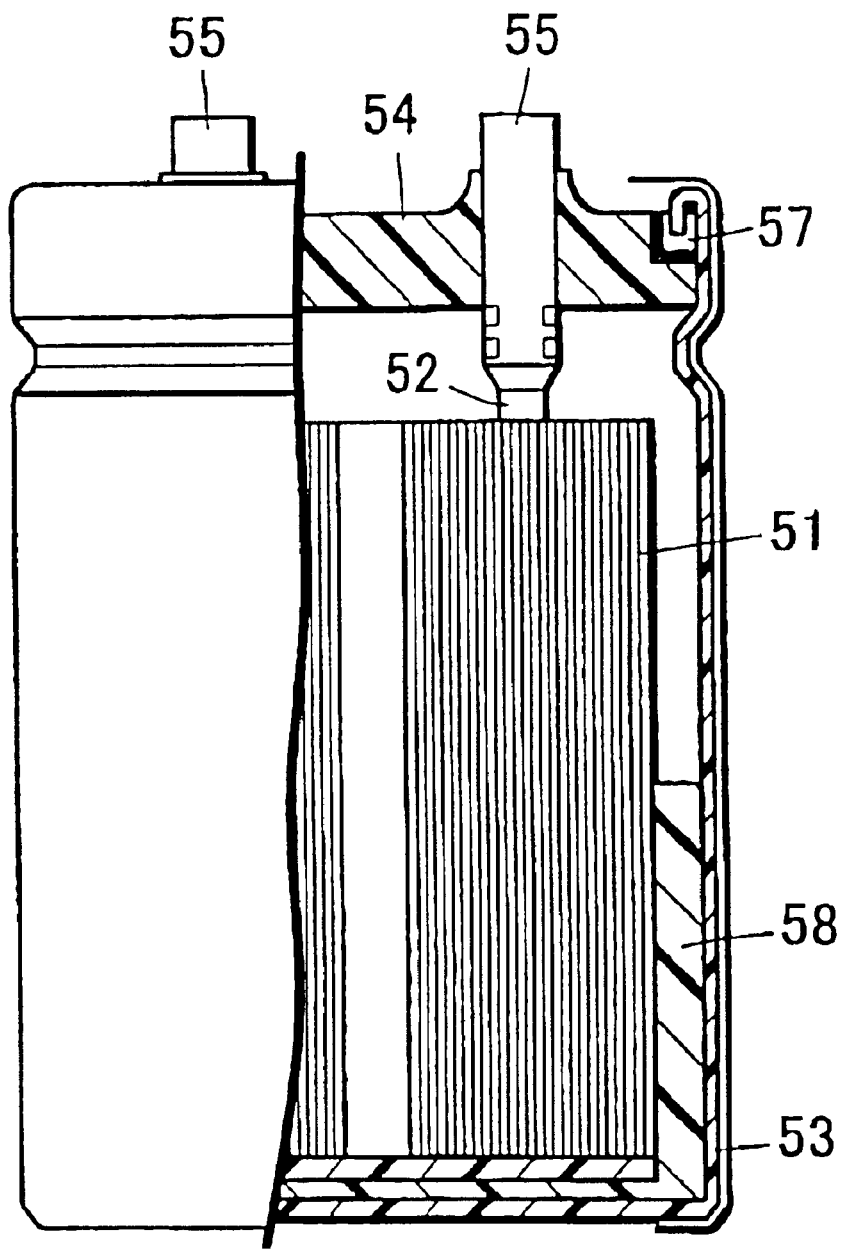
FIG. 6 is a partially sectional front view showing constitution of a conventional aluminum electrolytic capacitor.
Figure 7:
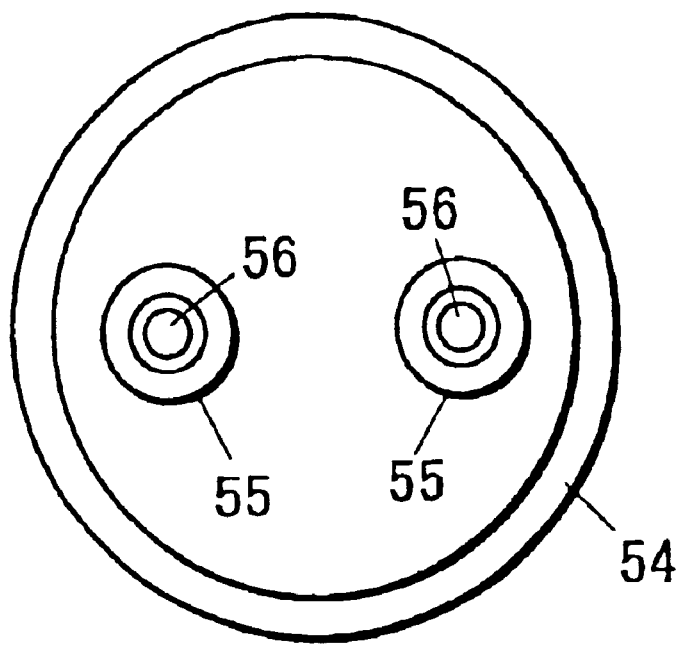
FIG. 7A is plan view showing constitution of a sealing plate of the conventional aluminum electrolytic capacitor.
FIG. 7B is a front view showing constitution of a sealing plate of the conventional aluminum electrolytic capacitor.
Figure 7:
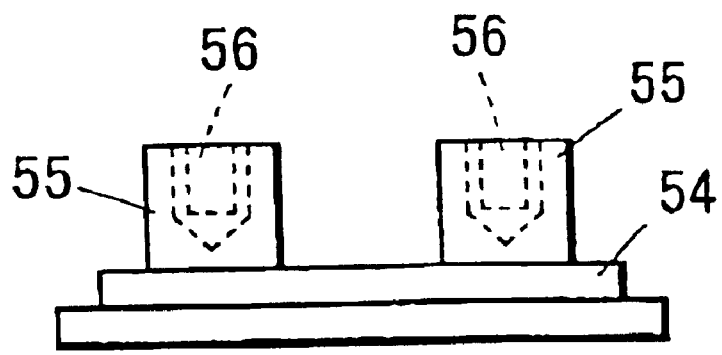

The comparative examples in the Table 1 have a structures illustrated in FIG. 6. In addition, two types of vibration testing were classified into ten steps of patterns within 10 to 500 Hz (referred to as vibration testing A hereafter) and that within 30 to 2000 Hz (referred to as vibration testing B hereafter). There were five samples for each testing.

As apparent from the table 1, the extracted lead member 2 of the aluminum electrolytic capacitor in the embodiment 1 has not disconnected even if vibration testing was made with high vibration frequency. On the other hand, although the aluminum electrolytic capacitor of the comparative example had no problem for the vibration testing A, the lead members were all disconnected for the vibration testing B.

According to the aluminum electrolytic capacitor of the above-mentioned embodiment 1, the aluminum electrolytic capacitor having excellent resistance to vibration may be obtained since fixing of the capacitor element 1 is made by fitting the fixing rod 4 provided at the center of the bottom of the metallic case 7 into the core portion of the capacitor 1, by fixing the periphery of the capacitor element 1 by means of the annular protrusion 12 provided inside the metallic case 7 and by contacting the end face of the capacitor element 1 with the fixing rib 5.

In addition, the sheet 3 of elastic body wound around the periphery of the capacitor element 1 has the effect that it protects the capacitor element 1 when the protrusion 12 is formed inside the metallic case 7 while absorbing vibration of the metallic case 7 when vibration is applied to possibly avoid transmission of vibration to the capacitor element 1.

Moreover, the ability of radiation of heat may be improved by contacting the projected end face of the one side of the cathode foil with the fixing rib 5 provided on the bottom of the metallic case 7, therefore it is possible to be difficult to rise the temperature of the capacitor element 1. Because the fixing rib 5 is integrally formed with the metallic case 7 and therefore the effect of radiation of heat maybe exhibited further.

Embodiment 2

In the aluminum electrolytic capacitor of in this embodiment according to the present invention, the elastic sheet preferably may be of a rubbery material having a thickness in a range from 80 to 800 $\mu$m, which have a function of preventing the capacitor element from being damaged by outer impacts.

The aluminum electrolytic capacitors were made similarly to the embodiment 1 except using the sheets made of silicone rubber in a thickness levels of 60, 80, 100, 200, 400, 600, 800, and 1,000 $\mu$m as.

The table 2 shows the result of vibration testing concerning the aluminum electrolytic capacitor made like the embodiment 1. Here, there were ten samples respectively and these mean values are shown.

Moreover, the elastic sheet 3 made of silicone rubber was used, however, the sheet of PTFE or copolymer with PTFE, that of chemical resistance materials such as PTFE rubber and butyl polymer rubber may be used.

Embodiment 3

In an aluminum electrolytic capacitor of the present invention, preferably, the sealing plate may be provided with a projected portion which is fitted into the hollow hole part of the upper face of the capacitor element and a plurality of fixing ribs, which is radially provided, for abutting with the upper end face of the capacitor element to hold the element, therefore the projected portion having function of preventing the capacitor element from vibrating, which further improves vibration resistance.

Figure 3:
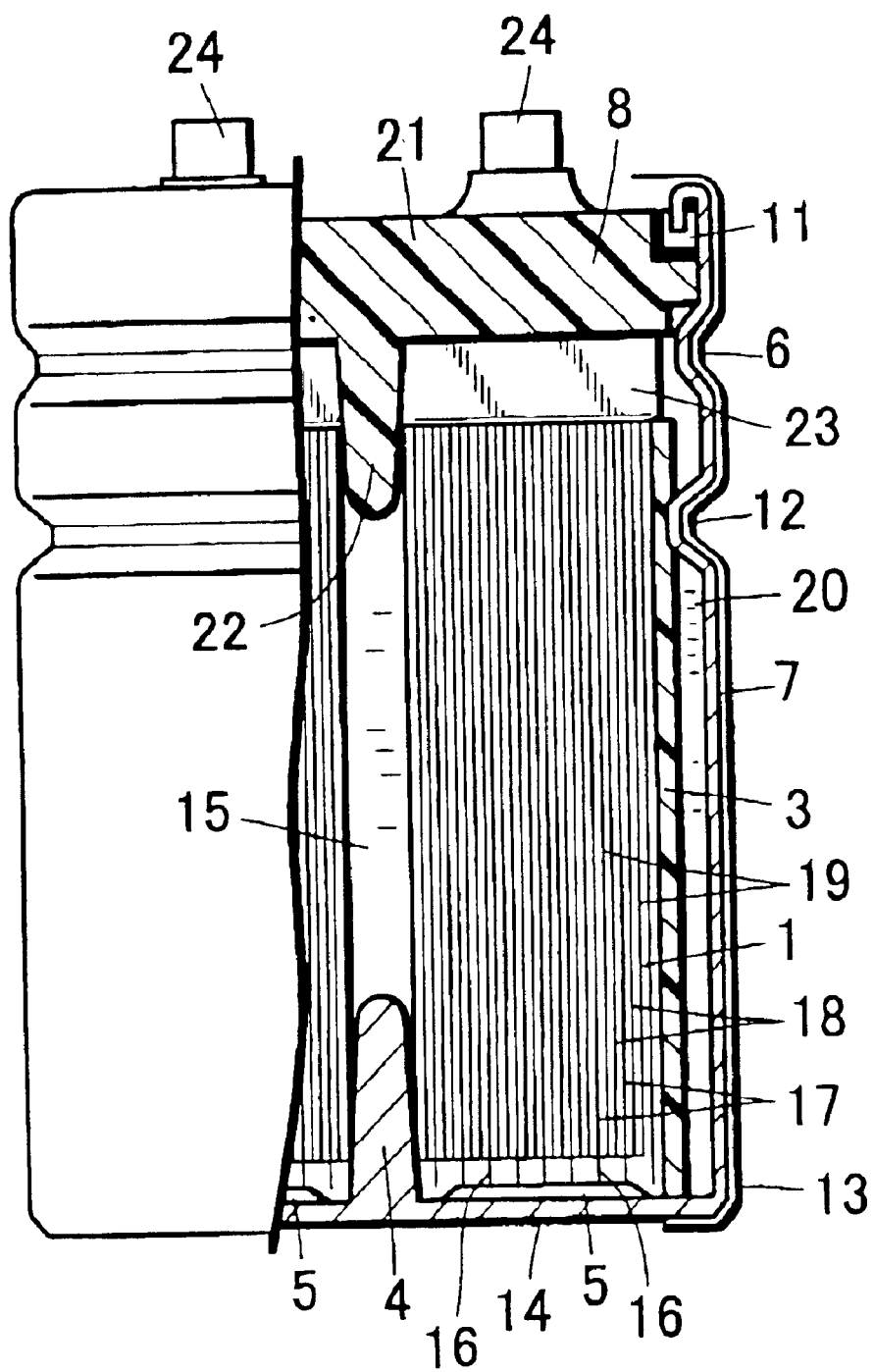
FIG. 3 is a partially sectional view showing an aluminum electrolytic capacitor according to another embodiment of the present invention.
Figure 4:
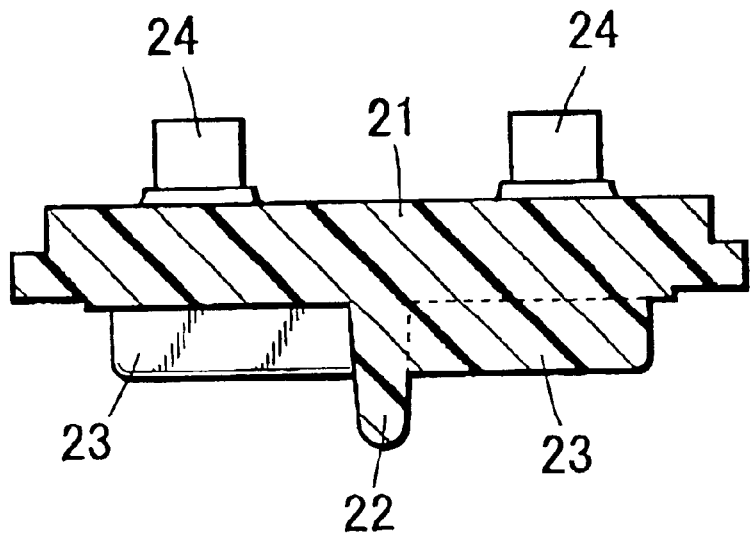
FIG. 4A is a cross-sectional view of a sealing plate using in the another embodiment of the present invention.
FIG. 4B is a perspective view showing the sealing plate, which is seen upward from the bottom side, as shown in FIG. 4A.
Figure 4:
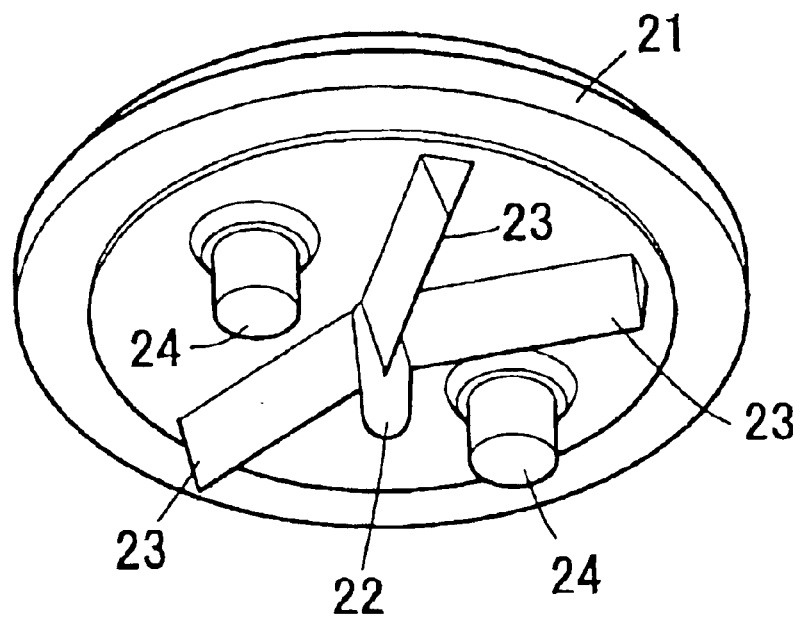

The structure of the capacitor according to this embodiment is shown in FIGS. 3, 4A and 4B. In FIG. 3, the sealing plate is provided with a projected portion 22 projected downwardly from a center on the back face of the plate downwardly, which can be inserted and fitted into a upper hollow hole of the core of the capacitor element 1. Further, as shown in FIGS. 4A and 4B, several fixing ribs 23 are formed on the down surface of the sealing plate, to abut with the upper end face of the capacitor element 1. A pair of terminals 24 are formed passing through the sealing plate with a connection portion provided for connecting with the extracted lead member of the capacitor element 1. The other structures of the capacitor of this embodiment is similar to that of the embodiment 1.

The aluminum electrolytic capacitor of the embodiment 3 can improve the action and effect of the embodiment 1 further since the upper end face of the capacitor element 1 is fixed by means of the projected portion 22 and the fixing rib 23 while the periphery of the capacitor element 1 is fixed by means of the annular protrusion 12 provided inside the metallic case 7 like the embodiment 1 described above.

Embodiment 4

The aluminum electrolytic capacitor of this embodiment may have an annular protrusion provided inside the metallic case formed by contracting the periphery of the case, and

TABLE 2

| Vibration testing conditions | Vibration testing A | | | | Vibration testing B 30 to 2000 Hz 20 Gal max | | | |
|---|---|---|---|---|---|---|---|---|
| sheet | 10 to 500 Hz 10 Gal max | | | | | | | number of |
| thickness ($\mu$m) | C ($\mu$F) | Tan$\delta$ (%) | LC ($\mu$A) | Disconnection | C ($\mu$F) | tan$\delta$ (%) | LC ($\mu$A) | disconnection |
| 60 | 1008.3 | 2.14 | 64.3 | No | 1005.2 | 3.46 | 82.4 | 4 |
| 80 | 1011.4 | 2.24 | 61.8 | No | 1010.6 | 2.86 | 74.4 | 0 |
| 100 | 1021.1 | 2.16 | 63.4 | No | 1012.4 | 2.74 | 71.6 | 0 |
| 200 | 1014.6 | 2.41 | 66.2 | No | 1005.2 | 2.53 | 69.4 | 0 |
| 400 | 1024.6 | 2.34 | 58.6 | No | 1018.7 | 2.48 | 68.5 | 0 |
| 600 | 1022.4 | 2.28 | 60.4 | No | 1014.5 | 2.39 | 67.2 | 0 |
| 800 | 1011.2 | 2.34 | 65.3 | No | 1011.6 | 2.65 | 73.6 | 0 |
| 1000 | 1012.5 | 2.46 | 68.2 | No | 1000.4 | 4.26 | 84.3 | 0 |

It is obvious from the table 2 that the aluminum electrolytic capacitor having no problem on the vibration testing may be obtained by setting the thicknesses of the sheet 3 of elastic body from 80 to 800 $\mu$m. In the case where the thickness of the sheet 3 is less than 80 $\mu$m, four disconnected capacitors were produced for the vibration testing B. In the case where the thickness of the sheet 3 is greater than 1000 $\mu$m, heat is stored in the capacitor element 1, the values of tan $\delta$ and LC become high for the vibration testing B and therefore the characteristic of the aluminum electrolytic capacitor is degraded.

therefore the annular protrusion has the action of fixing the capacitor element securely via the elastic sheet without damage thereof.

Such annular protrusions can readily be formed by contracting one turn or two the periphery around the body of the case after insertion of the capacitor element into the case.

Figure 5:
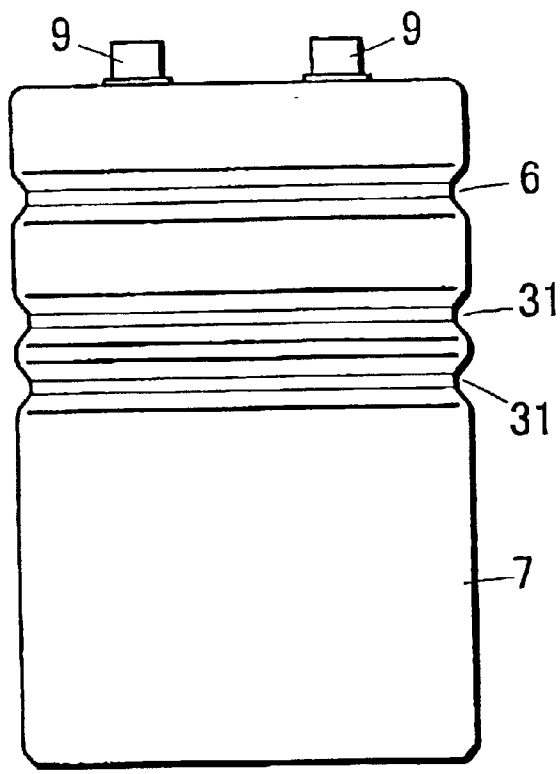
FIG. 5A is a front view showing constitution of an aluminum electrolytic capacitor according to the embodiment 4 of the present invention.
FIG. 5B is a front view showing another constitution of an aluminum electrolytic capacitor according to the embodiment 4 of the present invention.
Figure 5:
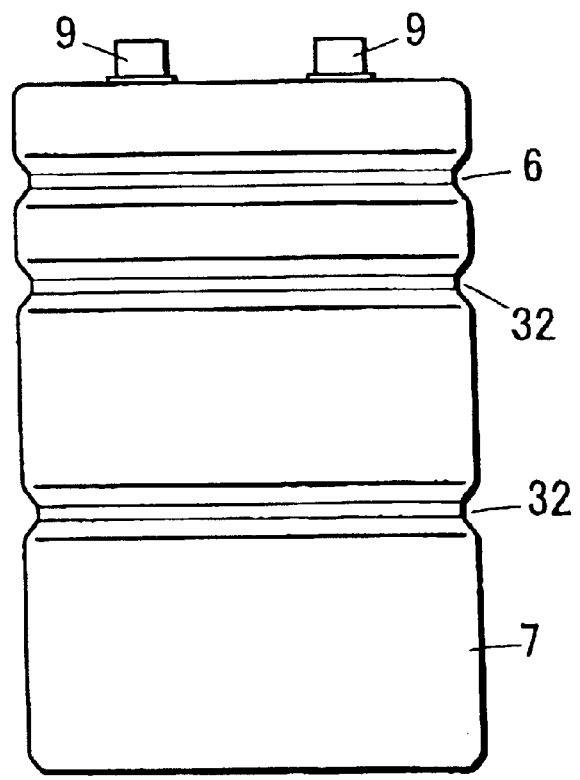

FIGS. 5A and 5B are side views showing an aluminum electrolytic capacitor according to the embodiment 4. Referring to FIG. 5A, there are provided two annular protrusions 31 projected inside the metallic case by contraction work so as to abut with the upper side of the capacitor element. Referring to FIG. 5B, also two annular protrusions 32 inside the metallic case by contraction work so as to abut with the upper portion and mid-position of the capacitor element.

According to the embodiment 4, the aluminum electrolytic capacitor having more excellent resistance to vibration than that of the embodiments 1 and 3 may be obtained since fixing of the capacitor element become strong further by providing annular protrusions 31 and 32 inside the metallic case.

As described above, the aluminum electrolytic capacitor according to the present invention has constitution comprising the hollow capacitor element constituted by interposing the separator between an anode foil and the cathode foil with which the extracted lead member is connected respectively and winding the anode foil and the cathode foil so that one end face of the cathode foil is projected, the elastic sheet which is wound on the periphery of the capacitor element, the cylindrical metallic case having the bottom in which there are provided with the fixing rod for fitting into the hollow hole part of the capacitor element and the fixing rib for abutting with the projected end face of the cathode foil and the sealing plate including a pair of terminals in which there are provided with the connecting portion with which the extracted lead member of the capacitor element is connected and the threaded portion for external connection, wherein the capacitor element is housed into the case with driving electrolyte and the open end of the case is sealed with the sealing plate around which the O-ring is provided while the capacitor element wound with the sheet is partly fixed by means of the annular protrusion provided inside the case, and therefore has the action that heat of the capacitor element may be radiated from the metallic case to the exterior thereof by means of the fixing rib provided on the bottom thereof and resistance to vibration for high-frequency vibration may be improved since the capacitor element may be fixed certainly by means of the fixing rod provided on the bottom of the case and the annular protrusion provided on the inside surface of the case.

Moreover, there is provided the action that manufacturing process may be simplified and the productivity maybe increased since the fixing rod for fitting into the hollow hole part of the capacitor element and the fixing rib for abutting with the projected end face of the cathode foil are integrally formed with the metallic case by impact forming process.

What is claimed is:

1. An aluminum electrolytic capacitor comprising:
    a hollow capacitor element comprising an anode foil, a cathode foil each having an extracted lead member connected thereto, and a separator between both the foil wound into a coil, an end face of the cathode foil is projected relative to the corresponding face of the anode foil;
    a elastic sheet which is wound on the periphery of the capacitor element;
    a cylindrical metallic case having the bottom in which a fixing rod is projected on the center of the bottom for fitting into a hollow hole part of the capacitor element and one or more fixing ribs are provided on the bottom for abutting with the projected end face of the cathode foil; and
    a sealing plate for covering the upper opening of the metal case which has a pair of terminals formed passing through the sealing plate for connecting to extracted lead member of the capacitor element and a threaded portion for external connection; wherein
    the metal case has one or more annular extrusions projected inside around the case;
    the capacitor element is housed in the case with an electrolyte with the upper opening of the case being sealed with the sealing plate via an O-ring around the periphery of the sealing plate; and
    the capacitor element is partly fixed via the elastic sheet by the one or more annular protrusions inside the metal case.

2. The aluminum electrolytic capacitor according to claim 1, wherein the sealing plate has:
    a projection portion, projected bottomward on the center of the plate which fits into the hollow hole of the upper face of said capacitor element; and
    a plurality of fixing ribs radially projected which abut with the upper end face of said capacitor element to hold the element.

3. The aluminum electrolytic capacitor according to claim 1, wherein said elastic sheet is a rubbery sheet having thickness in a range of 80 to 800 $\mu$m.

4. The aluminum electrolytic capacitor according to claim 1, wherein the annular protrusion is formed by contracting the periphery of the case.

5. A process of manufacture for an aluminum electrolytic capacitor which comprises:
    forming a hollow capacitor element by interposing a separator between an anode foil and a cathode foil with which an extracted lead member is connected respectively and winding the anode foil and the cathode foil so that one end face of the cathode foil is projected;
    winding an elastic sheet on the periphery of the capacitor element;
    inserting the capacitor element and driving electrolyte into a cylindrical metallic case having the bottom in which there are provided with a fixing rod for fitting into a hollow hole part of the capacitor element and a fixing rib for abutting with the projected end face of the cathode foil;
    connecting the extracted lead member of the capacitor element with a connecting portion provided on the sealing plate;
    sealing an open end of the case by curling the open end thereof with an O-ring provided around the sealing plate; and
    fixing a portion of the capacitor element wound with the sheet by contracting the periphery of the case to form an annular protrusion.

* * * * *